United States Patent [19]

Yen

[11] Patent Number: 4,963,253

[45] Date of Patent: Oct. 16, 1990

[54] ANTI-CLOGGING AND DIALYSIS DEVICE FOR FILTRATION SYSTEMS

[76] Inventor: Richard C. K. Yen, 4261 Chase Ave., Los Angeles, Calif. 90066

[21] Appl. No.: 292,991

[22] Filed: Jan. 3, 1989

[51] Int. Cl.⁵ .................. B01D 61/28; B01D 63/06; B01D 63/08; B01D 65/08

[52] U.S. Cl. .................. 210/195.2; 210/195.3; 210/257.2; 210/258; 210/321.75; 210/321.76; 210/321.78; 210/321.84; 210/321.85; 210/321.87; 210/416.1; 210/433.1; 210/645; 210/650

[58] Field of Search .............. 210/644, 645, 646, 650, 210/805, 195.2, 257.2, 321.72, 321.75–321.79, 416.1, 433.1, 195.3, 258, 651; 604/4–6

[56] References Cited

U.S. PATENT DOCUMENTS

| | | | |
|---|---|---|---|
| 3,352,422 | 11/1967 | Heden | 210/321.76 |
| 3,882,861 | 5/1975 | Kettering et al. | 604/66 |
| 3,976,574 | 8/1976 | White | 210/929 |
| 4,191,182 | 3/1980 | Popovich et al. | 210/195.2 |
| 4,252,651 | 2/1981 | Soderstrom | 210/321.65 |
| 4,366,061 | 12/1982 | Papenek et al. | 210/321.65 |
| 4,540,492 | 9/1985 | Kessler | 210/321.75 |

Primary Examiner—W. Gary Jones
Attorney, Agent, or Firm—Thomas I. Rozsa

[57] ABSTRACT

An apparatus and method for filtering and dialyzing a suspension including particulates and increasing the concentration of retainable matter wherein the suspension is drawn through the filter in a manner such that a negative pressure gradient is exerted on the suspension to cause the particulates to be drawn away from the filter membrane and avoid clogging the filter membrane. The apparatus comprises a multiplicity of pumps which are located downstream from the filter to thereby suck the suspension out of the filter and away from the filter membrane. The apparatus also comprises a multiplicity of different valve arrangements which permit filtering and dialysis to be performed independently of each other or simultaneously. A multiplicity of different filters, including stacked circular and rectangular filters are utilized such that locations within the system with the greatest clogging potential will be compensated and overcome by a corresponding more negative pressure to decrease the potential of clogging.

4 Claims, 5 Drawing Sheets

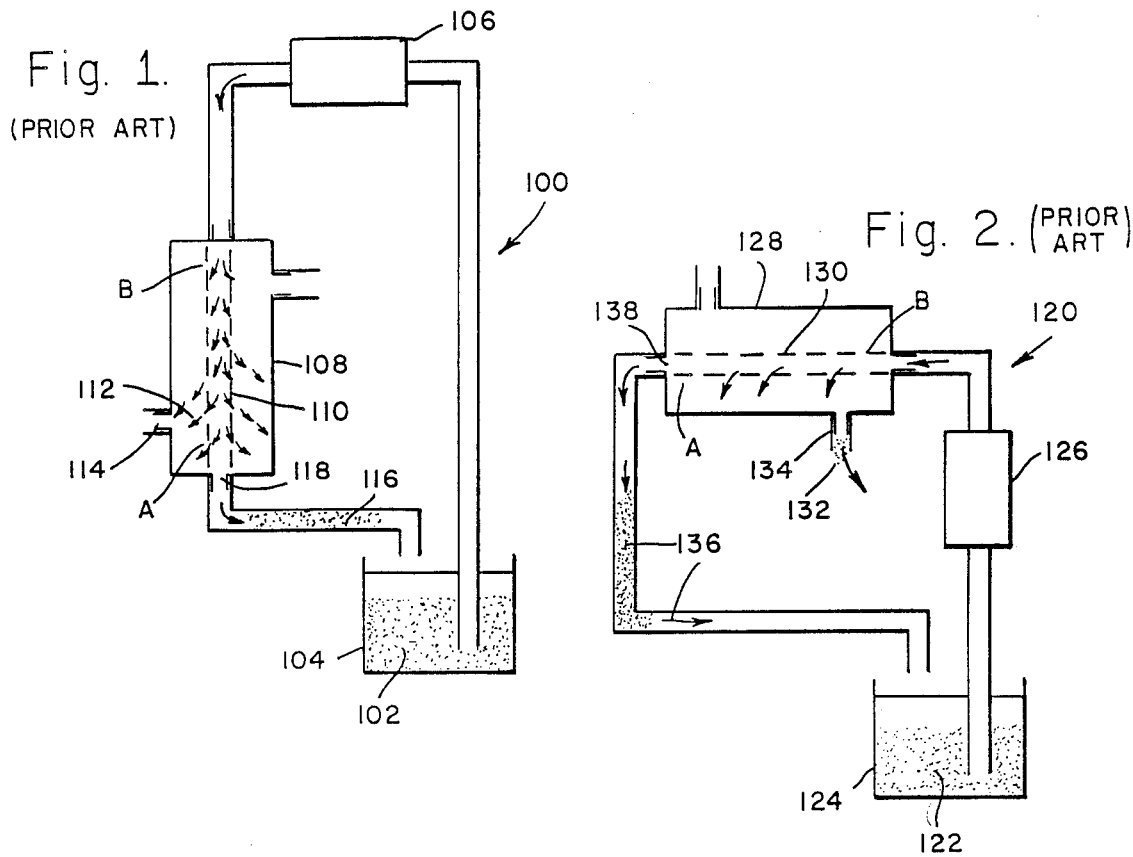
Fig. 1. (PRIOR ART)
Fig. 2. (PRIOR ART)
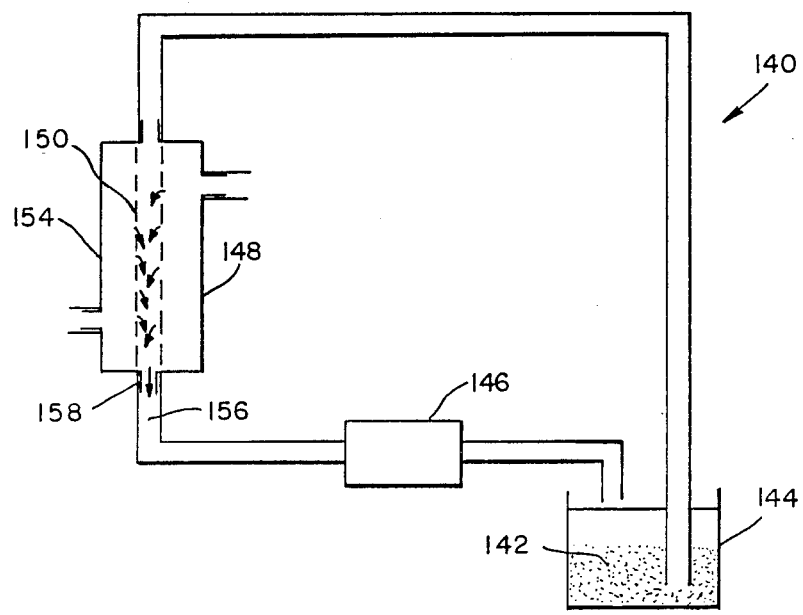
Fig. 3.

ANTI-CLOGGING AND DIALYSIS DEVICE FOR FILTRATION SYSTEMS

BACKGROUND OF THE INVENTION

1. Field of the Invention

The present invention relates to filtration systems. Filtration systems have conventionally been used for either (1) removal of particulate matters from fluid suspensions to result in clear, non-turbid fluids or, (2) removal and discarding of part of the soluble and fluid fraction for the purpose of concentrating the desirable particulate matters. To achieve the first purpose, the filter in the system is used to trap the particulate matters by virtue of the effective pore sizes being smaller than the particulate matters, while allowing the soluble fraction to go through the filter pores and collected for subsequent use. To achieve the second purpose, the ideal filter will allow the soluble fraction to go through the filter pores with only minimal entrapment of the particulate matters which are then returned to collection containers as the "retentate" fraction for subsequent use. In both procedures, clogging of the filter remains a major problem.

2. Description of the Prior Art

The clogging of filter pores is a major problem with prior art filtration and dialysis devices. Clogging of the filter pores quickly reduces the efficiency of the filtration system. As the number of unclogged pores diminishes, filtration rate decreases. Since flow rate is equal to pressure gradient divided by resistance, as more and more filter pores are clogged (increasing resistance), a progressively large pressure gradient is needed to maintain adequate flow rates. Even then, when enough of the filter pores become clogged, flow rate will become for all practical purposes, zero. At that point, particulate matters can no longer be removed from fluid suspensions. In addition, if the purpose is to concentrate suspended particulate matters, clogging of filters will decrease the final yield of the particulate matters and may in fact decrease the concentration of such matters in the retentate.

To minimize the problem of clogging, various approaches have been designed, as reflected in different filtration systems on the market. One approach incorporates designs for vigorous stirring of the suspension physically above, or prior to interaction of the suspension with the filter surface. Examples include the Stirred Cells Series of Amicon Division, W. R. Grace & Co. However, such systems are ineffective because the distance between the stirring mechanism and the filter membrane (typically in millimeters) are several orders of magnitude larger than the diameter of the particles (typically in microns). Once the particulate matters are trapped within the filter pores, with constant positive filtration pressure pressing them against the filter membrane, agitation at a far distance (relative to the size of the particulate matters) will not effectively dislodge them. Moreover, high shearing forces generated by vigorous stirring may cause foaming and denaturation of the particulate matters.

Another approach involves the concept of tangential flow as exemplified by Millipore's Minitan system. Instead of applying pressure perpendicular to the surface of the filter, the suspension is pushed forward by positive pressure from a pump system so that it travels in a direction tangential to the filter surface. In theory, this design allows the particulate matters to travel in a direction tangential to the filter surface while the soluble phase goes through the filter pores in a direction perpendicular to the filter surface. In practice, however, substantial clogging still occurs. The reason is that the particulate matters are carried by the soluble phase of the suspension and will travel in the direction of the immediate fluid surrounding a given particle. Any time a fraction of the soluble phase goes through the filter pores (in a direction perpendicular to the filter surface), a proportional amount of particulate matters will travel with it in the same direction. Regardless of the direction of flow of the rest of the suspension bulk (which may travel in a direction tangential to the filter surface), the fraction that goes through the pores will clog up the pores. With this understanding, it becomes clear that tangential flow filter systems are only different ways of recirculating the bulk of the suspension before its interaction with the filter pores. This design does not substantially alter the clogging potentials of particulate matters at the level of the filter pores because the particulate matters are again pressed onto the pores by the positive pressure used to circulate the bulk of the suspension.

Since both the stirred cell design and the tangential flow systems use positive pressure to circulate the suspension, they both result in trapping of particulate matters within the matrix of the filter membrane. For this reason, these systems are not suitable for the purpose of concentrating particular matters. There exists a need for a novel design where: (1) the filter membrane will not be clogged, and (2) should unexpected change in the filtration condition lead to some clogging, the obstructed pores will become unclogged again. Such a device will allow efficient concentration of valuable particulate matters. In addition, because of the increased life span of the filter membrane, it also allows cost-efficient collection of the soluble phase of the suspension, if the soluble phase is the desirable fraction from the suspension.

SUMMARY OF THE PRESENT INVENTION

To minimize the problem of clogging of filter membranes, to achieve constant undiminishing filtration rates, and to concentrate particulate matters without significant loss due to entrapment within the filter membrane matrix, the present invention anti-clogging device has the following essential features:

1. Instead of using positive pressure to push the suspension onto the surface of the filter membrane (whether the bulk of suspension travels in a direction perpendicular to or tangential to the surface of the filter membrane), this device employs a negative pressure to pull the suspension away from the surface of the filter. The definition of positive pressure is hereby defined as pressure forcing the suspension toward the retention surface of the filter for the particulate matters. The retention surface is that surface of the filter which faces the suspension and retentate, and which faces away from the filtrate (defined as the soluble fraction without the particulate matters). By this definition, conventional filtration systems using a negative suction from a vacuum source downstream from the filter unit in fact also applies a positive pressure on the particulate matters onto the filter retention surface. The present invention, by contrast, is truly anti-clogging and is novel because it is designed to actually pull particulate matters away from the retention surface of the filters.

2. The forces of negative pressure applied on the particulate matters pulling them away from the surface of the filter will be the greatest in locations within the filtration system where such particulate matters are most likely to clog the filter.

3. The present invention employs a more than one "pump system". Instead of the conventional single-pump system where positive pressure is used both to move the suspension toward the filter membrane surface and to push the soluble phase through the filter pores, the present invention employs separate "pump systems" so that the pressure used to circulate the bulk of the suspension can be regulated independently from the pressure used to extract the filtrate.

4. The "pump systems" employed with the present invention are ideally flow-regulated instead of pressure-regulated. In other words, a constant volume of suspension will pass through the filtration unit per unit time and a constant volume of filtrate will be extracted per unit time. However, certain components can use constant-pressure, variable-flow pumps.

5. The present invention also allows washing of the particulate matters with different buffers than that of the original suspension. It therefore serves the purpose of a dialysis unit except that there is no need to transfer material to a different device and risking loss or contamination of material.

6. The present invention allows alternating cycles of (a) Volume Reduction, VR (for the purpose of increasing the concentration of the particulate matters), and (b) Washing, W (for the purpose of changing the composition of the soluble phase) and (c) combining VR function simultaneously with W function; at any time and any sequence.

7. The present invention is compatible with all commercial filter units which typically have filter membranes in the form of hollow-fibers or cylindrical-coils bathed in a jacket containing circulating dialysis buffers. Examples are the Plasmaflo units by Parker Biomedical and the Curesis Plasma Separator by Organon Teknika Corp.

8. Although herein described as "particulate matters" (suspended in the "suspension") for easy understanding, the present invention is applicable to and includes as "particulate matter" such entities as protein molecules which are too large to pass through selective filter membranes. We use the term "particulate matter" to include any particles or molecules larger than the effective pore size of a given filter membrane, which has the potential of clogging the filter pores, whether the "particle" is in a solid or is in dissolved form, observable microscopically or not.

It has been discovered, according to the present invention, that the creation of a source of negative pressure downstream of the filter unit creates a force to pull particulate matter away from the filter membrane rather than push it into the filter membrane, thereby providing an anticlogging device which assures that the filter membrane will have a long and useful life.

It has further been discovered, according to the present invention, that the use of a multiplicity of pumps provides a system where the suspension can be re-circulated through the filter unit independently of the extraction of the filtrate portion.

It has additionally been discovered, according to the present invention, that the recirculation rate must generate a negative pressure great enough to pull particulate matter away from the retention surface of the filter, overcoming the positive pressure generated by the rate at which filtrate is extracted. The recirculation rate must be set so that the negative pressure in all parts of the filter membrane is always substantially greater than the positive pressure against the filter retention surface.

It has additionally been discovered, according to the present invention, that a dialysis fluid can be delivered to the filter unit at the same time the suspension is recirculated and the filtrate is extracted. The location whereby the dialysis fluid is infused to the filter unit can significantly enhance the anti-clogging of the filter membrane. In addition, introduction of a dialysis fluid will change the composition of the fluid phase of the suspension to a more desirable composition.

It has further been discovered, according to the present invention, that the concept of negative pressure can be utilized with a multiplicity of different filter arrangements including stacked filters of various configurations such as circular or rectangular. The direction of flow of suspension, filtrate and dialysis fluid within these filter arrangements and their connections to the pump systems are specifically designed to enhance the anti-clogging principles and function of this anti-clogging and dialysis device.

It is therefore an object of the present invention to provide an apparatus and method whereby a suspension comprising particulate matters and fluid phase can be filtered to either remove the particulate or to remove filtrate and increase the concentration of particulate matter in the remaining retentate in a manner in which the filter will not become clogged with particulate matter.

It is another object of the present invention to provide an apparatus and method whereby maximum flexibility is assured so that the recirculation process can be performed at different rates from the filtrate extraction process.

It is a further object of the present invention to provide a filtration method and apparatus and a wash-dialysis method and apparatus which can be performed independently using the same apparatus or which can be performed simultaneously, in a manner which will not clog the filter membrane of the apparatus.

It is an additional object of the present invention to provide a system which can utilize the principles of negative pressure to pull particulate matter away from the filter retention surface to be used in conjunction with filters of various configurations, including circular and rectangular.

Further novel features and other objects of the present invention will become apparent from the following detailed description, discussion and the appended claims, taken in conjunction with the drawings.

BRIEF DESCRIPTION OF THE DRAWINGS

Referring to the drawings for the purpose of illustration only and not limitation, there is illustrated:

FIG. 1 is a schematic flow diagram of prior art filtration systems in a vertical orientation, illustrating the direction of flow of both the suspension and the filtrate.

FIG. 2 is a schematic flow diagram of prior art filtration systems in a horizontal orientation, illustrating the direction of flow of both the suspension and the filtrate.

FIG. 3 is a schematic flow diagram illustrating a key principle of the present invention, namely having the pump downstream from the filter unit and the flow of fluid away from the retention surface of the filter membrane.

DETAILED DESCRIPTION OF THE PREFERRED EMBODIMENT

Figure 4:
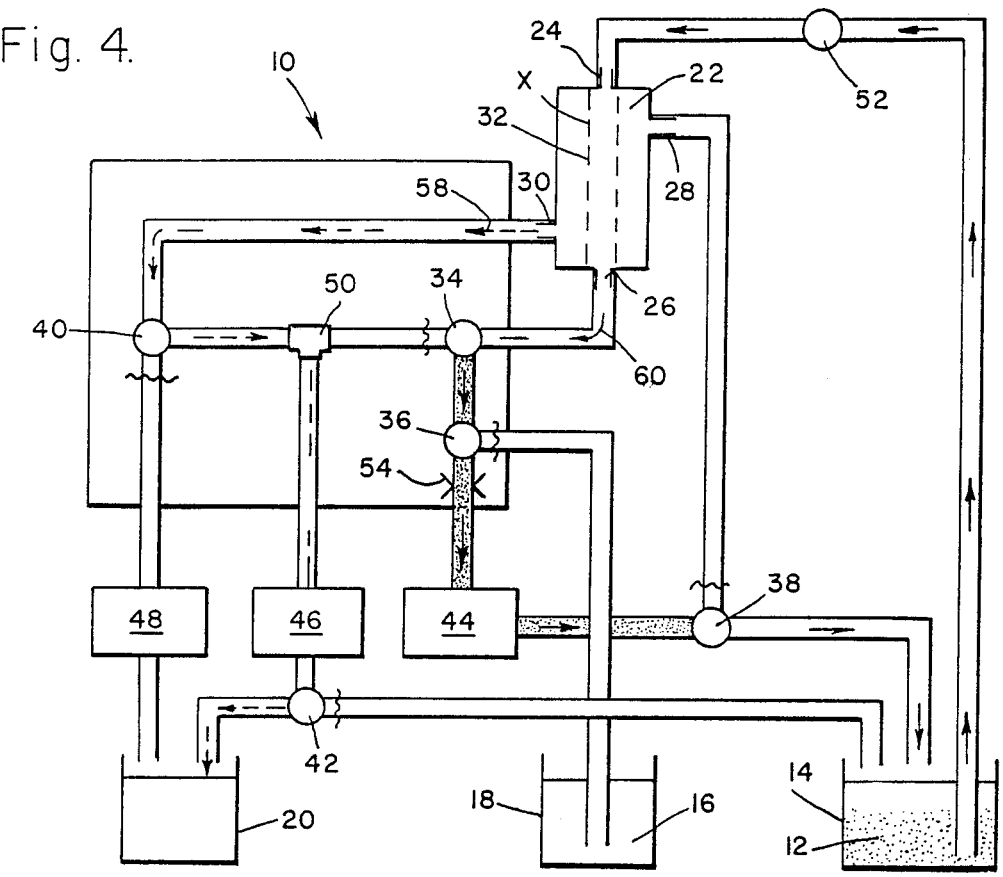
FIG. 4 is a schematic flow diagram of the present invention anti-clogging and dialysis device for filtration systems, illustrating the off-positions of all three-way valves during the volume reduction cycle.

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to FIGS. 1 and 2, there is illustrated the direction of flow of both the suspension and the filtrate in conventional arrangements of filter units, in a vertical position, and in a horizontal position, respectively. In FIG. 1, the vertical flow filter arrangement 100 illustrates the suspension 102 located in suspension holding tank 104. The pump 106 is located upstream of filter 108 and its filtration membrane 110. The pump 106 sucks suspension 102 out of suspension holding tank 104 and pushes it toward filter 108 and onto filtration membrane 110. The filtrate 112 exits opening 114 of filter 108 while the retentate 116 exits the filter at its bottom outlet opening 118 and flows back into the suspension holding tank 104. In FIG. 2, the horizontal flow filter arrangement 120 illustrates the suspension 122 located in suspension holding tank 124. The pump 126 is located upstream of filter 12B and its filtration membrane 130. The pump 126 sucks suspension 122 out of suspension holding tank 124 and pushes it toward filter 128 and onto filtration membrane 130. The filtrate 132 exits opening 134 of filter 128 while the retentate 136 exits the filter at its remote outlet opening 138 and flows back into the suspension holding tank 124. Examination of each of the filter units after filtration of a suspension will show that most clogging occurs at location A which is near the outlet of the filter unit, and much less at location B which is near the inlet of the filter unit. This is because there is a pressure gradient from the inlet of the filter unit to the outlet of the same unit. Therefore, the amount of clogging is not uniform within the filter unit. What is common to both units is the fact that the filters (110 and 130) become clogged with the particulate matter because the suspension is pushed onto the filter (110 and 130 respectively) since the pump is pushing the suspension with a positive pressure from upstream of the filter.

A key principle of the present invention is illustrated in the schematic flow diagram of FIG. 3. The flow filter arrangement 140 illustrates the suspension 142 located in suspension holding tank 144. The pump 146 is located downstream of filter 148 and its filtration membrane 150. The pump 146 sucks suspension 142 out of suspension holding tank 144 and causes it to flow through filter 148 but pulling the retentate 156 away from the retention surface of filter membrane 150. The retentate 156 exits the filter at its remote outlet opening 158 and is pulled away from the filter unit 148 by the pump 146 which then causes the retentate to flow back into tank 144. FIG. 3 illustrates the importance of having the pump downstream from the filter unit. With the jacket 154 filled with solutions of a different color, it can be easily demonstrated that the flow of fluid from the jacket into the center of the hollow filter fibers is such that particulate matters from the suspension will be swept away from the retention surface 150 of the filter 148.

Figure 5:
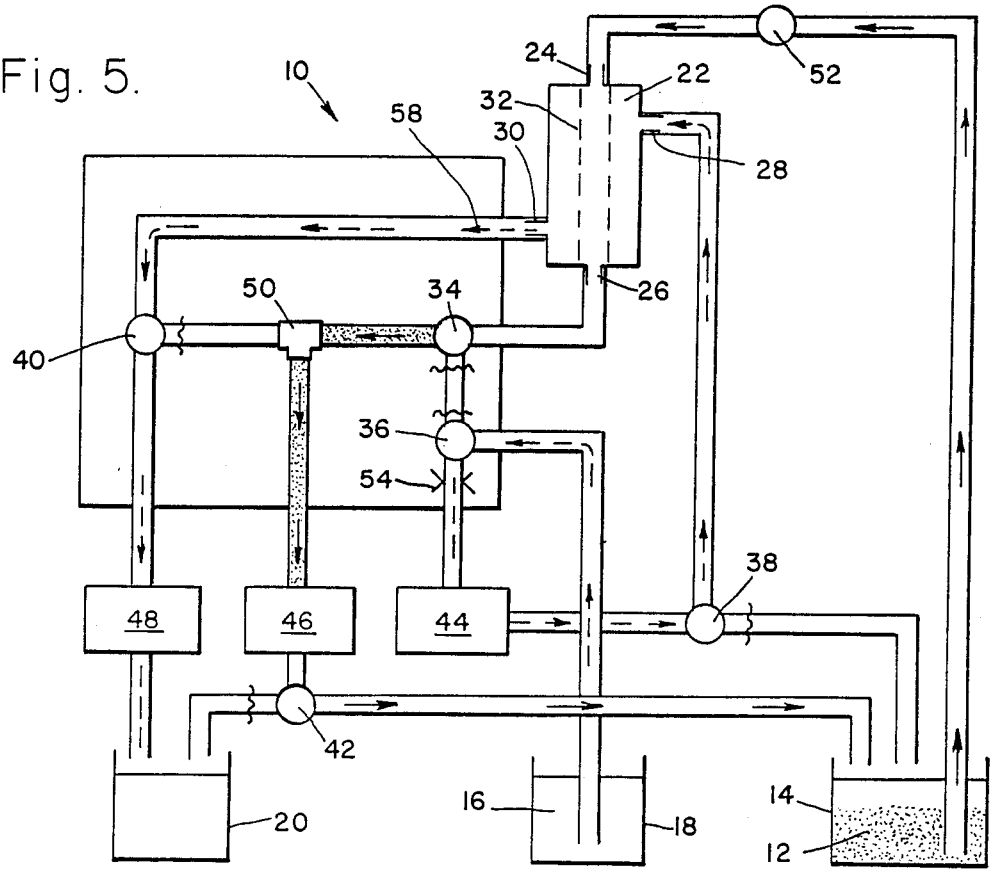
FIG. 5 is a schematic flow diagram of the present invention anti-clogging and dialysis device for filtration systems, illustrating the off-positions of all three-way valves during the wash-dialysis cycle.

FIGS. 4 and 5 show the arrangement of various components including 3 pumps (two of which are principally used), a filter unit, containers for the suspension to be concentrated or dialyzed, and rinsing or dialysis buffer, and the claimed design of the device. There are at least 5 three-way valves, one three-way connection and one one-way valve in the design.

Of primary importance is the fact that the circulation pump (the one circulating the bulk of the suspension between the container and the filter unit) operates down-stream from the filter unit so that fluid is drawn by negative pressure from the outlet of the filter unit. This is in contrast to most conventional filter units where the pump is up-stream from the filter unit, pushing the suspension toward the inlet of the filter unit.

The present invention anti-clogging and dialysis device for filtration systems 10 comprises a suspension 12 inside a suspension holding tank 14, a dialysis fluid 16 inside a dialysis fluid holding tank 18, and a filtrate or waste disposal tank 20. The device 10 further comprises a filter unit 22 having inlet opening 24, exit opening 26, first wall opening 28, second wall opening 30 and internal filter membrane 32. The device 10 further comprises five valves, first valve 34, second valve 36, third valve 38, fourth valve 40 and fifth valve 42. The device 10 also comprises three pumps, first pump 44, second pump 46 and third pump 48. A T-connection 50 joins first valve 34, fourth valve 40 and second pump 46. A one way valve 52 is located between suspension tank 14 and filter unit 22. An adjustable clamp 54 is located between second valve 36 and first pump 44.

FIG. 4 illustrates the off-positions of all three-way valves (34, 36, 38, 40 and 42) during the Volume Reduction (VR) cycle. The flow pathway of the retentate 60 is separate from the flow pathway of filtrate 58. During this cycle, first pump 44 serves the purpose of a circulation pump, pumping the suspension 12 between the container and the filter unit. First pump 44 should ideally be rate-regulated. Second pump 46 is also downstream from the filter unit 22 and serves to extract filtrate 58 from the suspension 12. Second pump 46 ideally should be rate-regulated so as to extract a constant amount of filtrate. Second pump 46 should ideally be connected to the filtrate port 30 which is closest to the outlet 26 of the filter unit 22. The filtrate extraction rate, i.e. amount of filtrate 58 extracted per unit time from the filter unit, must be less than the re-circulation rate, i.e. amount of retentate 60 leaving the filter unit 22 per unit time. In this embodiment, third pump 48 is turned off and the flow paths are as follows. First pump 44 sucks suspension 12 out of the suspension holding tank 14 and causes it to go through filter unit 22, entering through entrance 24 and being pulled inwardly away from filter membrane 32 (as illustrated in FIG. 3) and out exit opening 26, through first valve 34, second valve 36, through first pump 44, through third valve 38 and back into suspension holding tank 14. Second pump 46 sucks the filtrate 58 out lower portion or second sidewall opening 30, through fourth valve 40, through T-section 50, through second pump 46, through fifth valve 42 and into waste disposal tank 20.

The design of this device is such that the recirculation rate is always substantially greater than the filtrate extraction rate is of prime importance in insuring that particulate matters do not clog the filter pores. The reason for such an arrangement is to make certain that the overall negative pressure pulling particulate matters away from filter pores 32 is always greater than the overall positive pressures pressing the particulate matters against the pores to clog them.

The ratio of the recirculation rate to the filtrate extraction rate, however, is affected by a number of factors. For example, a filter unit placed in a verticle position will have the gravitational force facilitating the flow of retentate in a vertically down direction (such as in FIG. 4), naturally unclogging particles from the retention surface of the filter membrane. Therefore, even for a slow recirculation rate of about 10 cc/min, there is enough negative force unclogging the filter, that the filter membrane will not be clogged when a filtration extraction rate of 8 cc/min is applied. However, when the filter unit is placed in a horizontal position gravitational force tends to work in such a way that particulate matter will settle down inside the hollow filter fibers, creating a condition favorable to clogging. Therefore, a greater negative pressure is needed to unclog the filter membrane, e.g. by using at least a recirculation rate of 20 cc/min when an 8 cc/min filtration extraction rate is desired. Other factors will include viscosity of the fluid phase and how easy it is for the fluid to pass through the filter pores. Lower viscosity of the fluid and larger pore size will facilitate exit of the fluid with minimal positive pressure, thus allowing a higher filtrate extraction rate. The pore size in the filter membrane compared to the particulate size will also affect the optimal filtrate extraction rate vs the recirculation rate. If the particulate matters are much larger than the pore size, which means they do not clog easily anyway, a higher filtrate extraction rate again can be tolerated without proportionally increasing recirculation rate to increase the negative unclogging pressure. This design is truly an anti-clogging device because negative pressures on particulate matters is designed to be always greater than the positive pressures moving them toward any part of the filter surfaces.

Even during temporary disequilibrium of pressures at a given location along the filter fibers, the device is designed to unclog obstructed filter pores. The causes of pressure disequilibrium are many, but primarily because there are pressure gradients along different parts of the filter. Therefore, even though overall negative pressure is always greater than the positive pressure inside the filter unit, negative pressure at a given site is not always greater that the positive pressure exerted there. Consider the simple case of any single filter pore, X, located at any part of the hollow filter fiber inside the filter unit. Temporary disequilibrium of pressure may cause the positive pressure at X to exceed that of the negative pressure created by the pulling force of the recirculation pump. The resultant net positive pressure will cause pore X to be temporarily clogged. Once pore X is clogged, the positive pressure created by the filtrate pump will decrease at X to zero, because flow rate there becomes zero. (Flow rate is equal to pressure divided by resistance. When X is obstructed, resistance at X becomes infinitely large and so the pressure in the direction of the flow of fluid becomes zero). Since the negative pressure at X created by the pulling force of the recirculation pump remains unchanged, a decrease of positive pressure at X to zero will allow an increasingly larger net negative pressure to unclog again the particulate matters temporarily obstructing X.

FIG. 5 illustrates the off-positions of all three-way valves during the Wash-Dialysis (W) cycle. During this cycle, second pump 46 serves as the circulation pump. First pump 44, which has a faster rate, will push a relatively large amount of dialysis buffer 16 across the filter unit to bathe the filter fibers and by diffusion, to change the composition of the soluble phase of the suspension. Third pump 48 will be set at a rate at least equal to that of first pump 44, for the purpose of extracting the used dialysis fluid out of the filter unit at the same rate so that excess dialysis fluid will not exit the filter outlet 26 to flood the retentate and thus lower the concentration of the washed particulate matters. If it is desirable to perform both volume reduction as well as dialysis function at the same time, third pump 48 can be set at a rate slightly larger than that of first pump 44. When the rates are thus set, the volume of dialysis fluid extracted from the filter unit per unit time will be greater than the amount delivered. The difference must have come from the soluble phase of the suspension, thus reducing the volume of the recirculated suspension. Again, the difference between the rate of first pump 44 (dialysis fluid delivery) and third pump 48 (filtrate extraction rate) should not be greater than the recirculation rate. Otherwise, the positive pressure generated by the net extraction of the soluble phase may occasionally exceed the negative pressure generated by the recirculation pump 46.

Of importance is the presence of the one-way valve 52 so placed that large amounts of dialysis buffer 16 will not back-flow into the suspension container and so increase the total volume (thus reducing the concentration of suspended particulate matters).

If a filter 22 has more than one filtrate port, the one farthest away from the outlet of the filter unit (first opening 28) should be used for infusion of dialysis fluid. In contrast, the filtrate port closest to the filter outlet (second opening 30) should be used for filtrate exit. If the wrong connections are made, such as using opening 30 for infusion and opening 28 for exit of dialysis fluid, dialysis fluid will preferentially exit from the filter outlet 26 instead of opening 28. This is because the filter pores near the filter unit outlet port will experience the greatest negative pressure from the recirculating pump. In addition, the direction of flow of the dialysis fluid, when infused at second opening 30 under pressure, will also create a negative pressure (with respect to the retention surface 32 of the filter 22, which in the hollow fibers is the surface facing interior) at the pores near the filter outlet. Dialysis fluid will therefore enter into the interior of the hollow filter filters. Thus the combined greater increased negative pressure will draw the dialysis fluid (in addition to the suspension) out of the filter unit. When this happens, the retentate 60 will be diluted.

Another disadvantage of the wrong connection is that the pores near the filter inlet 24 will be clogged. The reason for the clogging is that the negative pressure generated by the recirculating pump is weakest at the pores near the filter inlet. In addition, part of the dialysis fluid, which had entered into the interior of the hollow fibers from pressure at opening 30, is now drawn toward opening 28 by the pulling of third pump 48. The direction of flow of fluid, from the interior of the fibers outwards, is positive with respect to the retention surface there. Therefore, for the pores near the filter inlet 24, the net pressure is greatly positive and thus tend to push the particulate matters onto the pores to clog them.

However, if the connections are properly arranged, such as in FIG. 5, with infusion of dialysis fluid through opening 28, and fluid extraction at opening 30, the design is at optimal condition for washing, or the combined function of volume reduction and washing. The direction of flow of dialysis fluid will be con-current with the flow of the suspension inside the hollow fibers. The pressure generated by second pump 46 is such that it creates a large negative pressure on the filter pores near the filter outlet 26 which will counter the pulling force of third pump 48 which generates a positive pressure (again with respect to the rentention surface 32) on the filter membrane. The negative pressure generated by pump 46 on the filter pores near the filter inlet 24 is not as great as that near the outlet 26, but the negative pressure is augmented by the negative pressure generated (again with respect to retention surface 32) by first pump 44. Again, to insure that the negative pressure is greater than the positive pressure near outlet 26, the difference between first pump 44 and third pump 48 (filtrate extraction rate) must always remain less than that of the recirculating pump.

In practice, the outer jacket of the filter unit should be completely primed with a suitable fluid (e.g. dialysis fluid) before all the pumps are turned on; especially the filtrate pump to extract the filtrate. This will insure that pressure is evenly distributed within the filter unit and that filtrate is extracted from the entire columns of filter fibers and not just from the portions of filter fibers near the outlet of the filter unit. The mechanism for priming the filter unit depends on the design of the filter unit. Some units are marketed with primary fluid inside the jacket (e.g. Curesis Plasma Separator). For those that come without a suitable priming fluid, pump 44 can deliver the dialysis fluid to the jacket until it is filled up from the bottom to the top. During priming, pump 46, 48 will be turned off and the one way valve 52 turned in a reverse direction to allow air to escape the filter unit until all tubings are completely primed. Then valve 52 will be turned back to its normal direction and the rest of the pumps set at their desirable pump rates, will be turned on for either the VR or W, or VR and W cycle.

Although presented conceptually here as separate "pump systems" such as first pump 44, second pump 46 and third pump 48, in practice a single pump with two heads can be used to combine the function of the first pump 44 and third pump 48 presented here; with a separate second pump 46 to be used nearby. An even more sophisticated pump with different gear ratios can also be employed to do the work of all three pumps, pulling the retentate 60 and the filtrate 58 at the desired ratio of recirculation to filtrate extraction flow rates.

In a research setting, having three separate pumps each independently regulating recirculating rate, filtrate extraction rate and dialysis fluid infusion rate will of course permit an educated operator to change an infinite combination of flow conditions to optimize the filtration or concentration effort and bypass the use of the present apparatus, although not the method. In terms of the ease of use, however, the present apparatus presents additional advantages. The 3 pumps can be set to deliver three fixed rates; such as pump 44 always at a high rate, pump 46 always at a medium rate and pump 48 always at a high rate. Then these pump rates will not have to be re-set again. A relatively uneducated operator can change the setting of the master switch in the present invention instead of changing the pump rates. When the master switch is turned to VR, the respective rates of pumps 44 and 46 will be suitable for volume reduction. When the master switch is turned to W or VR & W, the pre set rates of the pumps again will deliver the right amount of fluid relative to each other, most suitable for wash-dialysis or simultaneous function of VR & dialysis.

In practice, an adjustable clamp 54 can be placed between valve 36 and valve 38 as illustrated in FIG. 5, so that slight compression of the dialysis fluid infusion tubing will decrease the rate of delivery to opening 28 as compared to extraction of fluid from opening 30. Such an arrangement will permit a single pump with a dual-head to have one pump speed and yet deliver less fluid to opening 28 than extraction of fluid from opening 30, to achieve simultaneous volume reduction and wash-dialysis functions.

Figure 6:
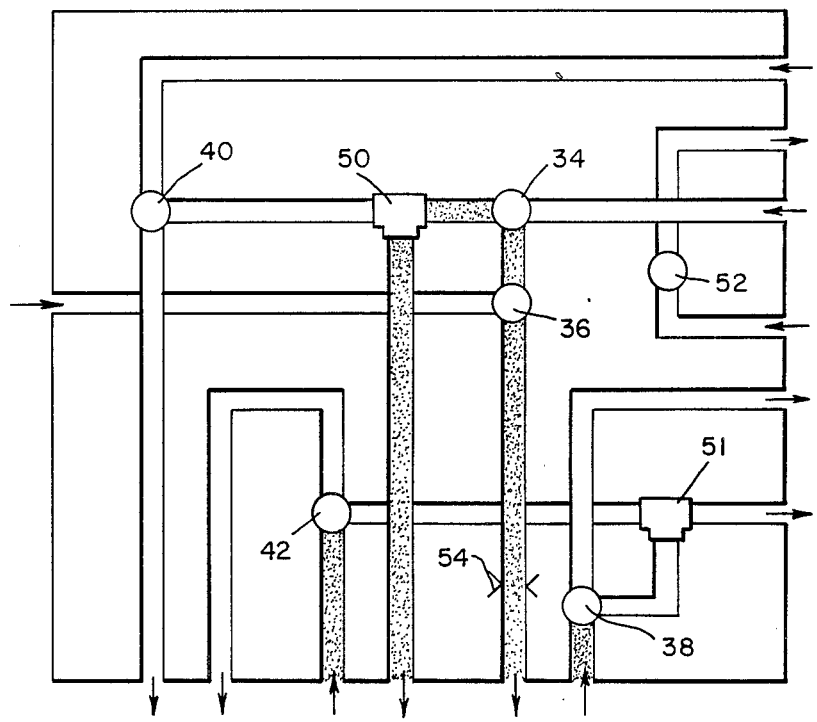
FIG. 6 illustrates a proposed design of the present invention anti-clogging and dialysis apparatus.

FIG. 6 illustrates the preferred design of the anti-clogging and dialysis valve system. T connection 51 joins valve 42 and valve 38 together so that fluid from either connection can exit the device from a common port. The 5 three-way valves presented here conceptually in a display plane appear to require independent turning, clockwise or counterclockwise, for the volume reduction and wash cycles. In practice, however, the device will be constructed such that they are stacked together, sharing one common axis, so that a master switch will turn all of the valves together, each in the proper direction. For example, valves 38 and 42 need to be turned clockwise to change from the volume reduction to washing cycle. In contrast, valves 34, 36 and 40 need to be turned counterclockwise. In practice, valves 38 and 42 will be stacked back to back with the valves 34, 36 and 40 so that they always turn in a direction opposite to that of valves 34, 36 and 40.

In addition to the volume reduction only and wash only position for the master switch outside the box containing the circuit and valves, there will be a third position for simultaneously performing volume reduction and wash (VR & W). Turning the master switch to this last position will allow graduated compression of the clamp 54 to allow simultaneous functions of volume reduction and washing - dialysis.

The shaded area in FIG. 4 represents the volume of retentate 60 that will be wasted when the master switch is turned from volume reduction to washing cycle. Similarly, FIG. 5 has a shaded area that indicates wastage of retentate 60 when the master switch is turned from washing to volume reduction. Therefore, the length of tubing in these parts, as indicated by the combined shaded area in FIG. 6 should be as short as possible.

Although fluid suspensions are used as a model here, this device, with the proper filter units, can be applied to concentrate or dialyse airborne particles or for separation of gaseous molecular species for the study of air contaminants.

Figure 7:
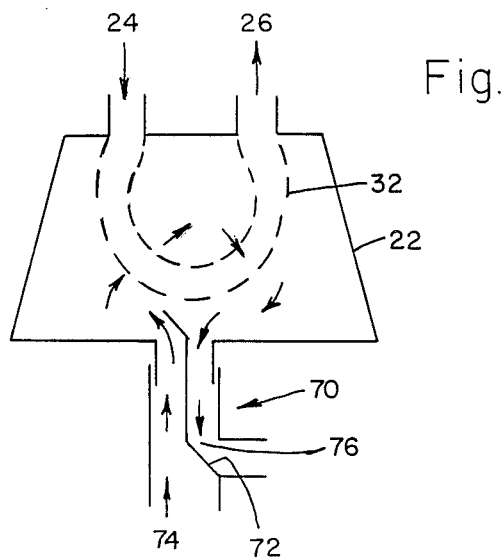
FIG. 7 illustrates a filter apparatus including an adaptor to convert a single sidewall port into two sidewall ports.

For filter units with only one filtrate port (either 28 or 30), an adaptor presented here is an optional feature. This adaptor is illustrated in FIG. 7. The filter 22 comprises an inlet 24, and outlet 26, and a retention filter surface 32 as before. The added element is adaptor 70 which includes a deflector-separator 72 within it such that when the adaptor is used to connect the device to the filtrate portion (either 28 or 30) of the filter unit 22 for use with the wash cycle, rinsing or dialysis buffer will enter the filter unit 22 in one compartment (for example 74) and the undesirable buffer will exit from the other compartment 76.

The material used to construct the device should ideally be sturdy, sterilizable, biologically compatible, corrosion-resistant and have minimal protein-binding capacity.

The present invention is an apparatus for filtering and dialyzing a suspension for the purpose of (i) increasing the concentration of particulate matters in a suspension with minimal entrapment of particulate matters, (ii) removal of fluid phase (filtrate) of suspension, (iii) changing the composition of the fluid phase of the suspension, and (iv) increasing effective life and filtration efficiency of filter membranes. It comprises: (a) a suspension holding means; (b) a suspension including particulate matter retained within said suspension holding means; (c) a dialysis buffer holding means; (d) a dialysis buffer retained within said dialysis buffer holding means; (e) means for capturing filtrate; (f) a filter means further comprising a housing having an inlet port, an exit port, a pair of sidewall openings, and a filter membrane within the housing; (g) a first pump means; (h) a second pump means; (i) a third pump means; (j) an interchangeable valve means; (k) means for interconnecting said first pump means, said second pump means, said third pump means and said interchangeable valve means to said filter means, to said suspension holding means, to said dialysis buffer holding means and to said means for capturing filtrate; (l) said first pump means, said second pump means and said third pump each functionally located downstream from said filter means when used for re-circulating suspension or extraction of filtrate from the fluid phase of the suspension; (m) said interchangeable valve means having a first setting wherein said first pump means causes said suspension to be drawn out of said suspension holding means and run through said filter means and recirculated back into the suspension holding means while said second pump means causes filtrate from the fluid phase of the suspension which has passed through said filter membrane to be drawn through one of said pair of sidewall openings in the filter housing and directed to said means for capturing filtrate; (n) when said interchangeable valve means is set at the first setting, said first pump means set to cause suspension flow at a rate sufficiently greater than the filtrate flow from the second pump means so that negative pressure away from the filter membrane generated on the recirculating suspension by said first pump means is greater than the positive pressure applied onto the filter membrane generated by the second pump means on said filtrate; (o) said interchangeable valve means having a second setting wherein said second pump means causes said suspension to be drawn out of said suspension holding means and run through said filter means and recirculated back into the suspension holding means while said first pump means causes dialysis buffer to be drawn out of said dialysis buffer means and run through one of said pair of openings in the sidewall of the filter housing and through the filter membrane while said third pump means causes dialysis buffer which has passed through the filter membrane and the dialysis buffer in the filter housing to be removed from the filter means through the other of said pair of openings in the sidewall of the filter housing and directed to said filtrate capturing means; (p) when said interchangeable valve means is set at said second setting, said third pump means is set to extract filtrate from the fluid phase of the suspension at a rate equal to the rate at which the first pump means delivers dialysis fluid to the filter means; (q) when said second pump means is set at said second setting, said second pump means is set to cause suspension flow sufficiently greater than the flow of dialysis buffer from said first pump and extraction rate of filtrates by the third pump so that negative pressure away from the filter membrane generated on the recirculating suspension by said second pump means is greater than the positive pressure against the filter membrane generated by the third pump means on said dialysis buffer; and (r) said interchangeable valve means having a third setting combining the settings set forth in element (o); (s) when said interchangeable valve means is set at said third setting, said third pump means is set to extract filtrate from the fluid phase of the suspension at a rate greater than the rate at which the first pump means delivers dialysis fluid to the filter means; and (t) when said second pump means is set at said third setting, said second pump means is set to cause suspension flow sufficiently greater than the difference between the infusion of dialysis buffer from said first pump and extraction rate of filtrates by the third pump so that negative pressure away from the filter membrane generated on the recirculating suspension by said second pump means is greater than the positive pressure against the filter membrane generated by the third pump means on said dialysis buffer; whereby the greater negative pressure generated by the downstream pump means on the suspension causes the particulate matter in the suspension to be drawn away from the filter membrane and thereby prevents clogging of the filter membrane.

The present invention also is an apparatus for filtering a suspension for the purpose of (i) increasing the concentration of particulate matters in a suspension with minimal entrapment of particulate matters, (ii) removal of fluid phase (filtrate) of suspension, and (iii) increasing effective life and filtration efficiency of filter membranes. It comprises: (a) a suspension holding means; (b) a suspension including particulate matter retained within said suspension holding means; (c) means for capturing filtrate; (d) a filter means further comprising a housing having an inlet port, an exit port, at least one sidewall opening, and a filter membrane within the housing; (e) a first pump means; (f) a second pump means; (g) an interchangeable valve means; (h) means for interconnecting said first pump means, said second pump means, and said interchangeable valve means to said filter means, to said suspension holding means, and to said means for capturing filtrate; (i) said first pump means, and said second pump means each located downstream from said filter means; (j) said interchangeable valve means having a setting wherein said first pump means causes said suspension to be drawn out of said suspension holding means and run through said filter means and recirculated back into the suspension holding means while said second pump means causes filtrate from the fluid phase of the suspension which has passed through said filter membrane to be drawn through said at least one sidewall opening in the filter housing and directed to said means for capturing filtrate; and (k) when said interchangeable valve means is set at said setting, said first pump means set to cause suspension flow sufficiently greater than the filtrate flow from the second pump means so that negative pressure away from the filter membrane generated on the recirculating suspension by said first pump means is greater than the positive pressure onto the retention surface of the filter membrane generated by the second pump means; (l) whereby the greater negative pressure generated by the downstream first pump means on the suspension causes the particulate matter in the suspension to be drawn away from the filter membrane and thereby prevents clogging of the filter membrane.

Defined more broadly, the present invention is an apparatus for filtering and dialyzing a suspension including particulates and increasing the concentration of retainable matter in the retentate, comprising: (a) means for retaining said suspension; (b) means for retaining a dialysis buffer; (c) means for filtering said suspension including a filter membrane; (d) means for drawing suspension out of the means for retaining said suspension and causing the suspension to pass through said means for filtering said suspension, wherein the particulates in the suspension are recirculated through said means for filtering said suspension without passing through and clogging said filter membrane while a portion of the fluid phase of the suspension is passed through said filter membrane and discarded; (e) means for drawing dialysis buffer out of the means for retaining said dialysis buffer and causing the dialysis buffer to pass through said means for filtering said suspension and pass through said filter membrane and be discarded; and (f) said means for recirculating said suspension causes a flow rate sufficiently greater than the flow rate created in extracting the filtrate and in infusing dialysis buffer through said filter means, whereby the flow rate of recirculating suspension creates a negative pressure gradient to prevent particulate matter from clogging said filter membrane.

Also, the present invention is an apparatus for filtering a suspension including particulates and increasing the concentration of retainable matter in the retentate, comprising: (a) means for retaining said suspension; (b) means for filtering said suspension including a filter membrane; (c) means for drawing suspension out of the means for retaining said suspension and causing the suspension to pass through said means for filtering said suspension, wherein most of the suspension is recirculated through said means for filtering said suspension without passing through and clogging said filter membrane while a portion of the fluid phase of the suspension is passed through said filter membrane and discarded; and (d) said means for recirculating said suspension causes a flow rate sufficiently greater than the flow rate created in passing a portion of fluid phase of the suspension through said filter membrane, whereby the flow rate of recirculating suspension creates a negative pressure gradient to prevent particulate matter from clogging said filter membrane.

The present invention is also a method for filtering and dialyzing a suspension including particulates and increasing the concentration of retainable matter in the retentate, comprising: (a) causing said suspension to be drawn through a filter means whereby most of the suspension is recirculated through the filter means without passing through and clogging the filter membrane while a portion of the fluid phase of the suspension is passed through the filter membrane and discarded; (b) causing a dialysis buffer to be delivered to said filter means whereby the dialysis buffer is passed through the filter membrane and discarded; (c) causing the rate of delivery of dialysis buffer to the filter means to be equal to or less than the rate of flow of the filtrate out of the filter means; (d) causing the rate of flow of the recirculating suspension to be greater than the difference (if any) between the rate of flow of the filtrate out of the filter means and the rate of flow of dialysis buffer infused into the filter means; and (e) causing the means of suspension recirculation to be located downstream of the filter means such that the greater rate of flow of the recirculating suspension generates a negative pressure on the suspension relative to the retention surface of the filter membrane to thereby overcome any positive pressure generated onto the filter membrane by the portion of the fluid phase of the suspension going through the filter membrane and the dialysis buffer going through the filter membrane, to cause particulate matter in the suspension to be drawn away from the filter membrane.

Defined more broadly, the present invention is a method for filtering a suspension including particulate matter and increasing the concentration of retainable matter in the retentate, comprising: (a) causing said suspension to be drawn through a filter means whereby most of the suspension is recirculated through the filter means without passing through and clogging the filter membrane while a portion of the fluid phase of the suspension is passed through the filter membrane; and (b) causing the means of suspension recirculation to be located downstream of the filter means such that the means of suspension recirculation generates a negative pressure on the suspension relative to the retention surface of the filter membrane to thereby cause particulate matter in the suspension to be drawn away from the filter membrane.

The present invention can be used with conventional filters 22 as illustrated in FIGS. 4 and 5. The present invention can also be used in conjunction with specialized filters to more effectively utilize the negative pull principles of the present invention. Although the anti-clogging device described above will work with existing filter units on the market, certain designs of the filter units themselves are more consistent With the principles of anti-clogging as taught in this patent application. Two such designs are shown in FIGS. 8 and 9.

Figure 8:
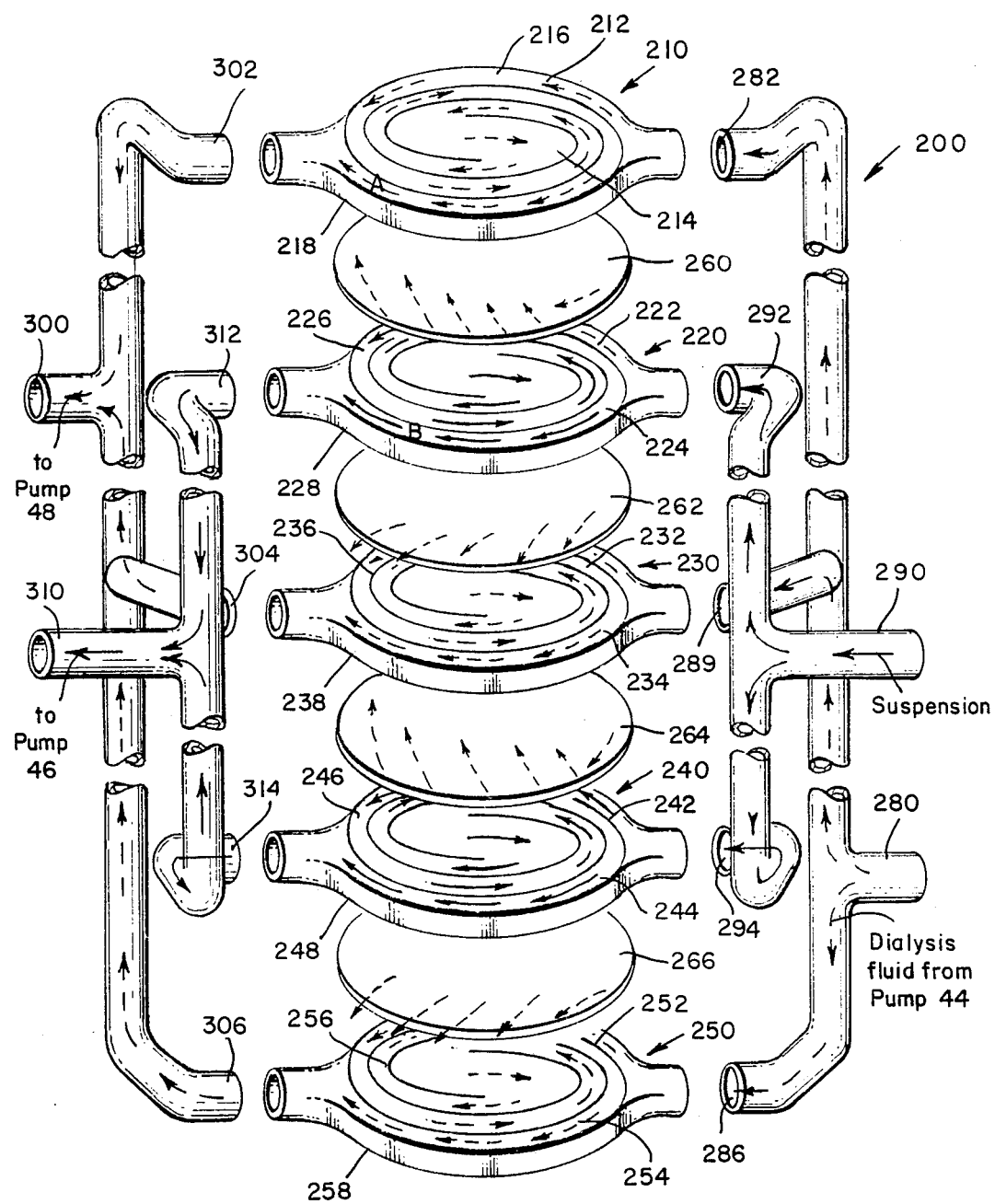
FIG. 8 is a perspective view of a multi-filter unit utilizing circular filter chambers and circular filter membranes, which can be utilized with the present invention.
Figure 9:
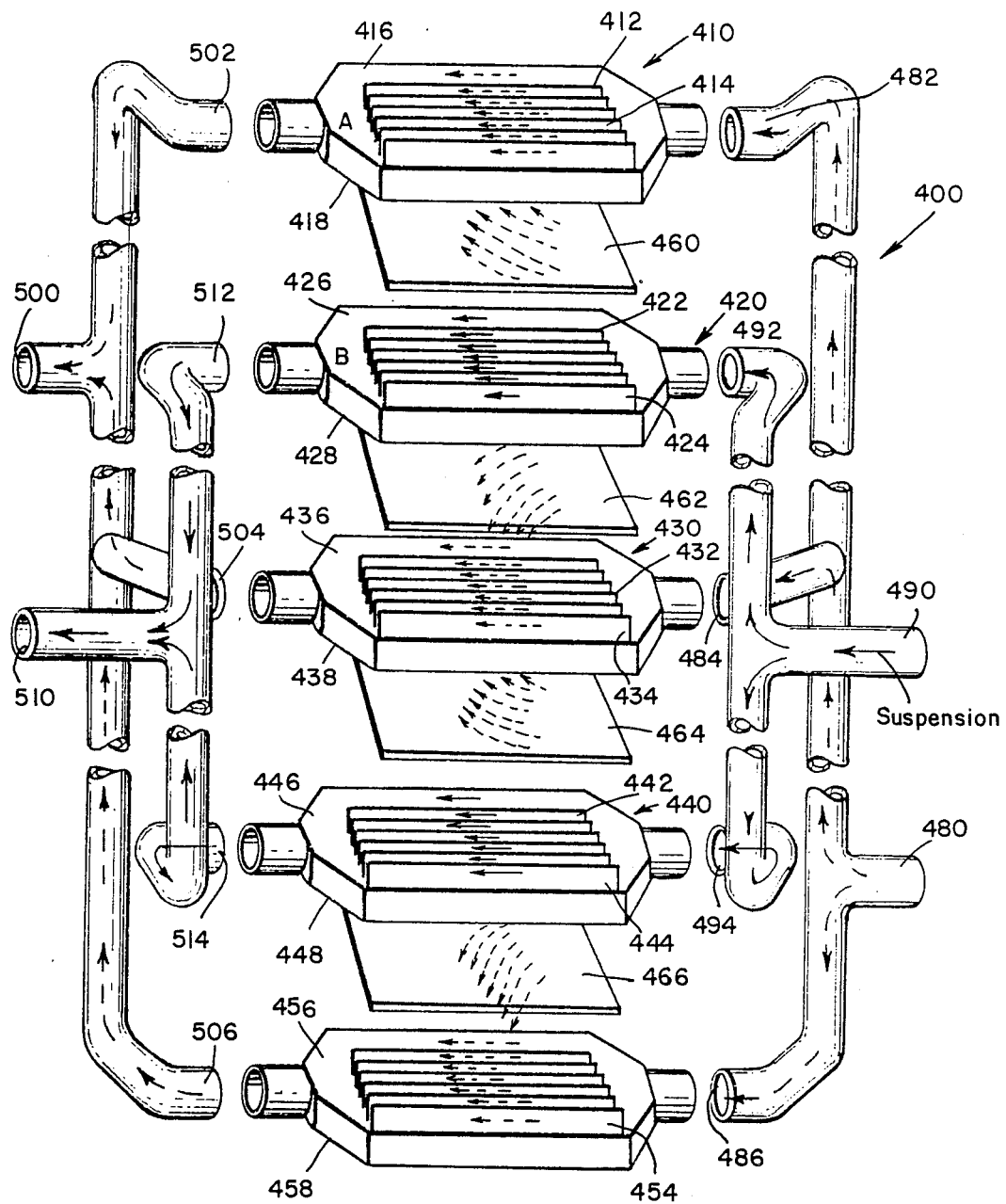
FIG. 9 is a perspective view of a multi-filter unit utilizing rectangular filter chambers and rectangular filter membranes, which can be utilized with the present invention.

Referring to FIG. 8, there is illustrated a circular design for a multi-layer filter unit 200. The main design features includes the following:

1. Within each circular filter disk there are two overlapping spirals arranged in such a way so as to create a continuous pathway into and out of the unit. Referring to dialysis fluid conducting disk 210, there is inward spiral path 212 and outward spiral path 214. The broken arrows show the direction of fluid flow, first into fluid conducting disk 210 along inward spiral path 212 and then exiting fluid conducting disk 210 along outward spiral path 214. Disk 210 has an impermeable top surface 216 and a permeable bottom surface 218. A filter membrane can rest against any permeable (either the top surface or the bottom) surface of a fluid conducting disk. In the illustration of FIG. 8, the filter 260 rests against only the permeable bottom surface 218 of dialysis fluid conducting disk 210. Essentially the path of the bulk of fluid, which in the case of disk 210 will be dialysis fluid, will be tangential to the surface of the filter 260. In addition, the path will utilize evenly the entire surface of the filter 260.

2. In the preferred embodiment, three or more similarly designed circular hollow disks (or chambers) with the spiral pathways comparable to 212 and 214 inside will be stacked in such a way that the top and bottom disks can be used to circulate dialysis fluid and alternating disks will circulate the suspension. In the illustration in FIG. 8 there are 5 disks which are stacked one on top of the other, with filter membranes separating adjacent disks. Second fluid conducting disk 220, includes inward spiral path 222 and outward spiral path 224, and will be used to circulate the suspension containing particulate matters to be concentrated. The solid arrows show the direction of (suspension) fluid flow, first into suspension conducting disk 220 along inward spiral path 222 and then exiting suspension conducting disk 220 along outward spiral path 224. Disk 220 has a permeable top surface 226 and a permeable bottom surface 228. Filter 260 rests between the bottom surface 218 of disk 210 and the top surface 226 of disk 220. Third fluid conducting disk 230 (for dialysis fluid), includes inward spiral path 232 and outward spiral path 234. The broken arrows show the direction of dialysis fluid flow, first into fluid conducting disk 230 along inward spiral path 232 and then exiting fluid conducting disk 230 along outward spiral path 234. Disk 230 has a permeable top surface 236 and a permeable bottom surface 238. Filter 262 rests between the bottom surface 228 of disk 220 and the top surface 236 of disk 230. Fourth fluid conducting disk 240 (for the suspension), includes inward spiral path 242 and outward spiral path 244. The solid arrows show the direction of (suspension) fluid flow, first into suspension conducting disk 240 along inward spiral path 242 and then exiting fluid conducting disk 240 along outward spiral path 244. Disk 240 has a permeable top surface 246 and a permeable bottom surface 248. Filter 264 rests between the bottom surface 238 of disk 230 and the top surface 246 of disk 240. Fifth fluid conducting disk 250, (for dialysis fluid) includes inward spiral path 252 and outward spiral path 254. The broken arrows show the direction of fluid flow, first into dialysis fluid conducting disk 250 along inward spiral path 252 and then exiting fluid conducting disk 250 along outward spiral path 254. Disk 250 has a permeable top surface 256 and a non-permeable bottom surface 258. Filter 266 rests between the bottom surface 248 of disk 240 and the top surface 256 of disk 250.

3. In the illustration in FIG. 8, disks 210, 230 and 250 are used to circulate dialysis fluids while disks 220 and 240 are used to recirculate the suspension. The top and bottom disks or chambers, 210 and 250 respectively differ from the middle chambers 220, 230, and 240 in that they have one surface (the top surface in disk 210 and the bottom surface is disk 250) which is non-permeable to fluids. All middle surfaces have both contact surfaces permeable to fluids.

4. While the filters 260, 262, 264, and 266 have been described as single filters, two or more filter papers or filter membranes can be sandwiched between the hollow disks.

5. Inlet 280 has ports 282, 284 and 286 which are attached to the inlet of disks 210, 230 and 250 respectively. Inlet 290 has ports 292 and 294 which are attached to the inlet of disks 220 and 240. Similar to the W cycle of FIG. 5, a first pump 44 is used to infuse dialysis fluid into the inlet 280. A second pump 46 as previously described (FIG. 5) is connected to outlet 310 and used to pull by negative pressure the suspension through inlet 290. A third pump 48, as previously described is connected to outlet 300 and used to pull (from downstream) the dialysis fluid through inlet 280. Outlet 300 is connected to exist ports 302, 304 and 306 which are used to remove (used dialysis) fluid from disks 210, 230 and 250 respectively. Outlet 310 is connected to exit ports 312 and 314 which are used to remove fluid (the retentate) from disks 220 and 240 respectively. For infusion of new dialysis fluid, inlet 280 is connected to the third pump as previously described.

Again, the pumps are arranged so that the recirculation pump and the filtrate extract pump are downstream from the filter unit. As a result the negative pressure inside the suspension chambers or disks (chambers or disks which had the suspension flowing through) generated by the combined negative pressure (with respect to the retention surface of the filter membrane) of the recirculation pump 46 and the dialysis infusion pump 44 is always greater than the positive pressure generated by the filtrate extraction pump 48.

Again, the pathway of the dialysis fluid is parallel (or side by side) to and concurrent (in the same direction) to the flow of the suspension so as to exert optimal anticlogging function. This design is significantly different from existing designs e.g. in Minitan filters where the retentate flow is in a direction 90 degrees to the flow of the filtrates. Therefore in the prior art, the locations of maximal positive pressure are not matched by design with the maximal overcoming negative pressure on the filter membranes as this invention.

6. The filtrate extraction rate should ideally be less than the recirculation rate of the suspension.

7. If dialysis fluid is to be infused into the dialysis fluid chambers, the infusion rate must be equal to or less than the filtrate exit rate, as taught above. Again, if the filtrate exit rate is greater than the dialysis fluid infusion rate (for simultaneous VR & W), the difference between the two must still be less than that of the recirculation rate of the suspension.

8. Again, in this design of the filter unit itself, the pathway is so arranged that the areas with the greatest expected positive pressure (such as A on the bottom surface 218) on the retention surfaces of the filter membrane 260 (i.e. the surfaces facing the suspension chambers) will have the greatest counteracting and overcoming negative pressure (such as at B on the top surface 226) to assure unclogging of the filter pores.

9. The number of disks can be increased from 3 to 5 or 7 or more, to allow employment from 2 to 4 to 6 or more filters. When this arrangement is desirable, the consecutive disks will serve alternatively as dialysis fluid chambers or suspension chambers.

10. Flexible adaptors of adjustable lengths on one side will distribute either fresh dialysis fluid from one source to all dialysis disks, or allow the suspension to enter all suspension disks by negative pressure. Flexible adaptors on the collection side will regroup used dialysis fluid from different disks by the filtrate extraction pump. Similarly, the suspension disks will be so connected that one single pump can exert negative pressure to pull the suspension from all suspension disks.

11. Each chamber or disk will have alignment pins on the outside so that they can be stacked together and clamped down to prevent leakage of fluids from the side of the chambers.

12. The broken arrows on the filter membranes illustrate the direction of flow of fluids during the volume reduction and washing cycle. During this cycle, the infusion rate of dialysis fluid is less than the filtrate extraction rate. Therefore, a portion of the fluid phase of the suspension will move from the suspension disks to the dialysis fluid disks. Again, it is important to maintain a recirculation rate greater than the difference between dialysis fluid infusion rate and filtrate extraction rate.

In practice, all the disks should be primed first by infusion of a suitable dialysis fluid by pump 44 before the VR or W or VR & W cycle is turned to operation. Again, as described, if there is no need to dialyse the suspension, the anti-clogging devise will be turned to VR cycle and no infusion of dialysis fluid will occur via inlet 280.

Defined more broadly, this filter comprises: (a) a multiplicity of circular fluid circulating disks, each further comprising a spiral pathway to guide the fluid into, through and out of the circular fluid circulating disk; (b) a filter membrane located between adjacent circular fluid circulating disks; (c) selected subsets of said circular fluid circulating disks being interconnected to receive either suspension from said suspension holding means or dialysis buffer from said dialysis buffer holding means and guiding the suspension or dialysis buffer out of the filter means; and (d) the pathway of the dialysis fluid is parallel to and is concurrent (and never counter-current (180 degrees opposite) or cross current (90 degrees)) with the suspension fluid. This design is to ensure that the positive pressure tending to clog the filter membrane at any given location in the filter membrane is always matched by a counter-active and overcoming negative pressure pulling the particulates away from the retention surface of the filter membrane; (e) whereby the negative pressure generated by the downstream pump means causes particulate matter in the suspension which passes along the spiral pathway of each circular fluid circulating disk to be drawn away from the respective adjacent filter membrane.

An alternative embodiment 400 with rectangular chambers and rectangular filters is illustrated in FIG. 9. The main design features includes the following:

1. Within each rectangular filter chamber there are a series of parallel separators so as to create a continuous pathway into and out of the unit. The parallel separators serve to provide structural strength to the chamber. In addition, the distance between each separator is designed so that the flow characteristics of fluid across the entire surface is uniform, with no stagnation of flow in any corners or locations. This will ensure utilization of the entire filter surface area and maximizing of filtration efficiency. Referring to fluid conducting chamber 410, there are a multiplicity of separators 412 defining pathways 414. The broken arrows show the direction of fluid flow. Chamber 410 has a top surface 416 and a bottom surface 418. A filter can rest against either the top surface or the bottom surface or both of a fluid conducting chamber. In the illustration of FIG. 9, the filter 460 rests against only the bottom surface 418 of fluid conducting chamber 410. Essentially the path of the fluid which in the case of chamber 410 will be dialysis fluid, will be tangential to the surface of the filter 460. In addition, the path will utilize evenly the entire surface of the filter 460.

2. In the preferred embodiment, three or more similarly designed hollow chambers with the separators and pathways comparable to 412 and 414 respectively will be stacked in such a way that the top and bottom chambers can be used to circulate dialysis fluid. In the illustration in FIG. 9 there are 5 rectangular chambers which are stacked one on top of the other, with filters separating adjacent chambers. Second fluid conducting chamber disk 420, includes separators 422 and pathways 424. The solid arrows show the direction of fluid flow, first into fluid conducting chamber 420 and along pathways 424. Chamber 420 has a top surface 426 and a bottom surface 428. Filter 460 rests between the bottom surface 418 of chamber 410 and the top surface 426 of chamber 420. Third fluid conducting chamber 430 includes separators 432 and pathways 434. The broken arrows show the direction of fluid flow along the pathways. Chamber 430 has a top surface 436 and a bottom surface 438. Filter 462 rests between the bottom surface 428 of chamber 420 and the top surface 436 of chamber 430. Fourth fluid conducting chamber 440 includes separators 442 and pathways 444. The solid arrows show the direction of fluid flow along the pathways. Chamber 440 has a top surface 446 and a bottom surface 448. Filter 464 rests between the bottom surface 438 of chamber 430 and the top surface 446 of chamber 440. Fifth fluid conducting chamber 450 includes separators 452 and pathways 454. The broken arrows show the direction of fluid flow along the pathways. Chamber 450 has a top surface 456 and a bottom surface 458. Filter 466 rests between the bottom surface 448 of chamber 440 and the top surface 456 of disk 450.

3. In the illustration in FIG. 9, chambers 410, 430 and 450 are used to circulate dialysis fluids while chambers 420 and 440 are used to recirculate the suspension. The top and bottom chambers, 410 and 450 respectively differ from the middle chambers 420, 430, and 440 in that they have one surface (the top surface in chamber 410 and the bottom surface in chamber 450) which is non-permeable to fluids. All middle surfaces have both contact surfaces permeable to fluids.

4. While the filters 460, 462, 464, and 466 have been described as single filters, two or more filter papers or filter membranes can be sandwiched between the hollow disks.

5. Inlet 480 has ports 482, 484 and 486 which are attached to the inlet of chambers 410, 430 and 450 respectively. Inlet 490 has ports 492 and 494 which are attached to the inlet of chambers 420 and 440. Similarly, exit port 500 is connected to exit intakes 502, 504 and 506 which are used to remove fluid from chambers 410, 430 and 450 respectively. Exit port 510 is connected to exit intakes 512 and 514 which are used to remove fluid from chambers 420 and 440 respectively. As described in FIG. 5, using the W cycle, a first pump 44 is used to pump dialysis fluid through inlet 480. Exit port 510 is connected to the second pump 46 as previously described and exit port 500 is connected to the third pump 48 as previously described.

Again, the pumps are arranged so that the recirculation pump and filtrate extraction pump are downstream from the filter unit, so that combined negative pressure exerted by the recirculating pump and the infusion pump of the dialysis fluid will always result in a net negative pressure inside the suspension chambers (chambers which had the suspension flowing through) and always exerts an anti-clogging function.

Again, the pathway of the dialysis fluid is parallel (or side by side) to and concurrent (in the same direction) to the flow of the suspension so as to exert optimal anti-clogging function. This design is significantly different from existing designs e.g. in Minitan filters where the retentate flow is in a direction 90 degrees to the flow of the filtrates. Therefore in the prior art, the locations of maximal positive pressure are not matched by design with the maximal overcoming negative pressure on the filter membranes as this invention.

6. The filtrate extraction rate should ideally be less than the recirculation rate of the suspension.

7. If dialysis fluid is to be infused into the dialysis fluid chambers, the infusion rate must be equal to or less than the filtrate exit rate, as taught above. Again, if the filtrate exit rate is greater than the dialysis fluid infusion rate (for simultaneous VR & W), the difference between the two must still be less than that of the recirculation rate of the suspension.

8. Location A illustrates the site with the greatest positive pressure in the dialysis chamber, which will be counteracted with B, which has a greatest negative pressure in the suspension chamber. The arrows on the filter membranes indicate the direction of flow of fluids when the infusion rate of fresh dialysis fluid is less than the filtrate extraction rate, the difference being made up from the fluid phase of the suspension. It is essential to maintain a recirculation rate sufficiently greater than that of the difference between dialysis fluid infusion rate and the filtrate extraction rate.

Defined more broadly, this filter comprises: (a) a multiplicity of generally rectangular fluid circulating chambers, each further comprising a multiplicity of straight pathways to guide the fluid into, through and out of the generally rectangular fluid circulating chamber; (b) a filter membrane located between adjacent generally rectangular fluid circulating chambers; (c) selected subsets of said generally rectangular fluid circulating chambers being interconnected to receive either suspension from said suspension holding means or dialysis buffer from said dialysis buffer holding means and guiding the suspension or dialysis buffer out of the filter means; and (d) the pathway of the dialysis fluid is parallel to and is concurrent (and never counter-current (180 degrees opposite) or cross current (90 degrees)) with the suspension fluid. This design is to ensure that the positive pressure tending to clog the filter membrane at any given location in the filter membrane is always matched by a counter-active and overcoming negative pressure pulling the particulates away from the retention surface of the filter membrane; (e) whereby the negative pressure generated by the downstream pump means causes particulate matter in the suspension which passes along the straight pathways of each generally rectangular fluid circulating disk to be drawn away from the respective adjacent filter membrane retention surfaces.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus for filtering and dialyzing a suspension and increasing the concentration of retainable matter, comprising:
   (a) a suspension holding means;
   (b) a suspension including particulate matter retained within said suspension holding means;
   (c) a dialysis buffer holding means;
   (d) a dialysis buffer retained within said dialysis buffer holding means;
   (e) means for capturing filtrate;
   (f) a filter means further comprising a housing having an inlet port, an exit port, a pair of sidewall openings, and a filter membrane within the housing;
   (g) a first pump means;
   (h) a second pump means;
   (i) a third pump means;
   (j) an interchangeable valve means;
   (k) means for interconnecting said first pump means, said second pump means, said third pump means and said interchangeable valve means to said filter means, to said suspension holding means, to said dialysis buffer holding means and to said means for capturing filtrate;
   (l) said first pump means, said second pump means and said third pump each functionally located downstream from said filter means when used for re-circulating suspension or extraction of filtrate from the fluid phase of the suspension;
   (m) said interchangeable valve means having a first setting wherein said first pump means causes said suspension to be drawn out of said suspension holding means and run through said filter means and recirculated back into the suspension holding means while said second pump means causes filtrate from the fluid phase of the suspension which has passed through said filter membrane to be drawn through one of said pair of sidewall openings in the filter housing and directed to said means for capturing filtrate;
   (n) when said interchangeable valve means is set at the first setting, said first pump means set to cause suspension flow at a rate sufficiently greater than the filtrate flow from the second pump means so that negative pressure away from the filter membrane generated on the recirculating suspension by said first pump means is greater than the positive pressure applied onto the filter membrane generated by the second pump means on said filtrate;
   (o) said interchangeable valve means having a second setting wherein said second pump means causes said suspension to be drawn out of said suspension holding means and run through said filter means and recirculated back into the suspension holding means while said first pump means causes dialysis buffer to be drawn out of said dialysis buffer means and run through one of said pair of openings in the sidewall of the filter housing and through the filter membrane while said third pump means causes dialysis buffer which has passed through the filter membrane and the dialysis buffer in the filter housing to be removed from the filter means through the other of said pair of openings in the sidewall of the filter housing and directed to said filtrate capturing means;

(p) when said interchangeable valve means is set at said second setting, said third pump means is set to extract filtrate from the fluid phase of the suspension at a rate equal to the rate at which the first pump means delivers dialysis fluid to the filter means;

(q) when said second pump means is set at said second setting, said second pump means is set to cause suspension flow sufficiently greater than the flow of dialysis buffer from said first pump and extraction rate of filtrates by the third pump so that negative pressure away from the filter membrane generated on the recirculating suspension by said second pump means is greater than the positive pressure against the filter membrane generated by the third pump means;

(r) said interchangeable valve means having a third setting identical to the setting set forth in element (o);

(s) when said interchangeable valve means is set at said third setting, said third pump means is set to extract filtrate from the fluid phase of the suspension at a rate greater than the rate at which the first pump means delivers dialysis fluid to the filter means; and (t) when said interchangeable valve means is set at said third setting, said second pump means is set to cause suspension flow sufficiently greater than the difference between the flow of dialysis buffer from said first pump and extraction rate of filtrates by the third pump so that negative pressure away from the filter membrane generated on the recirculating suspension by said second pump means is greater than the positive pressure against the filter membrane generated by the third pump means;

(u) whereby the greater negative pressure generated by the downstream pump means on the suspension causes the particulate matter in the suspension to be drawn away from the filter membrane and thereby prevents clogging of the filter membrane.

2. An apparatus in accordance with claim 1 wherein said means for filtering said suspension further comprises:

a. a multiplicity of circular fluid circulating disks, each further comprising a spiral pathway to guide the fluid into, through and out of the circular fluid circulating disk;

b. a filter membrane located between adjacent circular fluid circulating disks;

c. selected subsets of said circular fluid circulating disks being interconnected to receive either suspension from said suspension holding means or dialysis buffer from said dialysis buffer holding means and guiding the suspension or dialysis buffer out of the filter means; and d. the pathway of the dialysis buffer is parallel to and concurrent with the pathway of the suspension fluid;

e. whereby the negative pressure generated by the downstream pump means causes particulate matter in the suspension which passes along the spiral pathway of each circular fluid circulating disk to be drawn away from the respective adjacent filter membrane.

3. An apparatus in accordance with claim 1 wherein said means for filtering said suspension further comprises:

a. a multiplicity of generally rectangular fluid circulating chambers, each further comprising a multiplicity of straight pathways to guide the fluid into, through and out of the generally rectangular fluid circulating chambers;

b. a filter membrane located between adjacent generally rectangular fluid circulating chambers;

c. selected subsets of said generally rectangular fluid circulating chambers being interconnected to receive either suspension from said suspension holding means or dialysis buffer from said dialysis buffer holding means and guiding the suspension or dialysis buffer out of the filter means; and d. the pathway of the dialysis buffer is parallel to and concurrent with the pathway of the suspension fluid;

e. whereby the negative pressure generated by the downstream pump means causes particulate matter in the suspension which passes along the straight pathways of each generally rectangular fluid circulating chamber to be drawn away from the respective adjacent filter membrane.

4. An apparatus in accordance with claim 1 wherein the pump means recirculating said suspension recirculates the suspension at a rate greater than the rate at which the pump means extracts filtrate or dialysis buffer from said filter means.

* * * * *